May 2, 1961  C. H. MATHIS  2,982,797
CATALYST REGENERATION AND APPARATUS
Filed Sept. 25, 1957  2 Sheets-Sheet 1
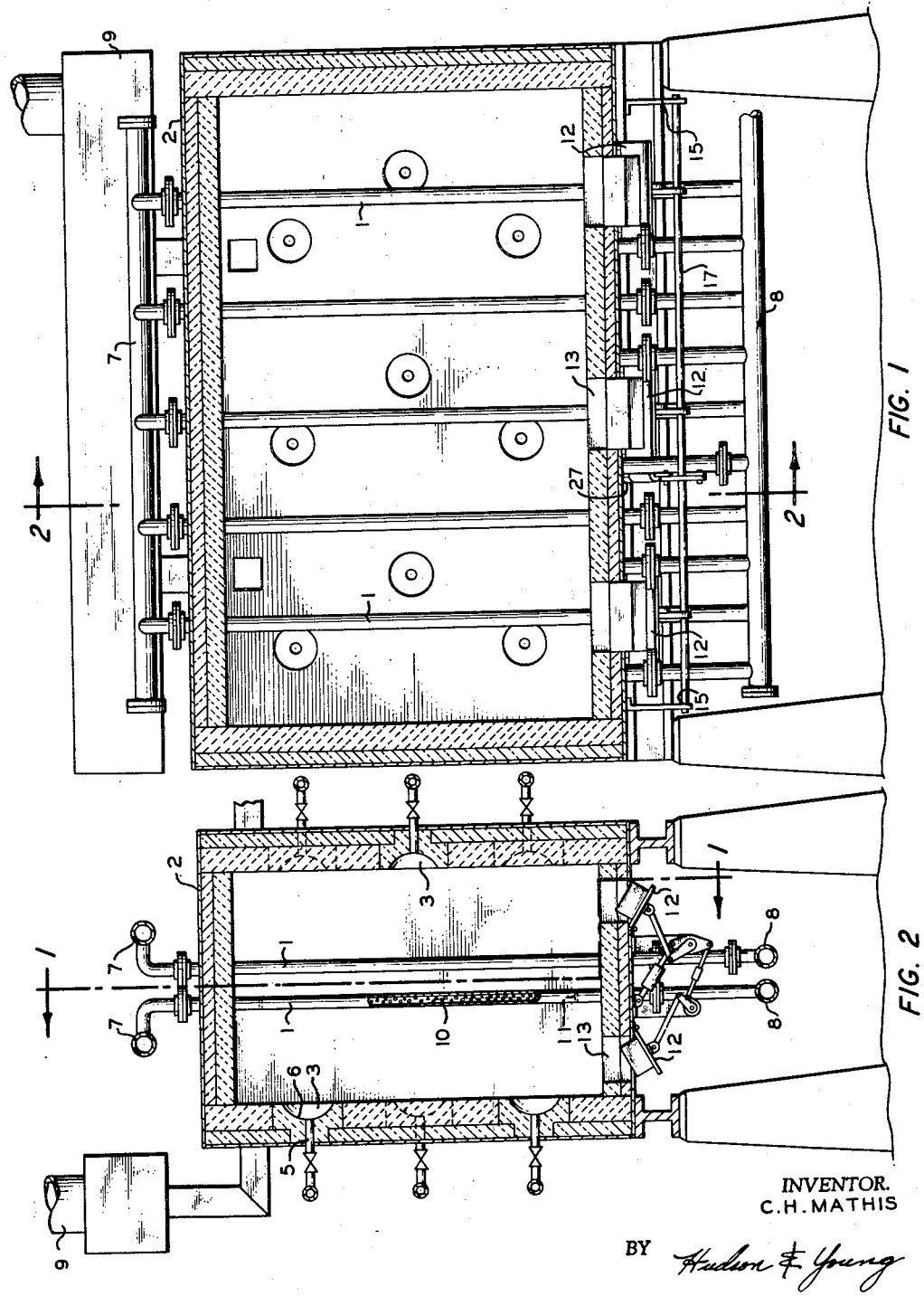
INVENTOR.
C.H. MATHIS May 2, 1961 C. H. MATHIS 2,982,797
CATALYST REGENERATION AND APPARATUS
Filed Sept. 25, 1957 2 Sheets-Sheet 2

INVENTOR.
C. H. MATHIS

United States Patent Office 2,982,797
Patented May 2, 1961

2,982,797

CATALYST REGENERATION AND APPARATUS

Clyde H. Mathis, Borger, Tex., assignor to Phillips Petroleum Company, a corporation of Delaware Filed Sept. 25, 1957, Ser. No. 686,104

1 Claim. (Cl. 260—683.3)

This invention relates to apparatus and to a method for controlling and effecting regeneration of a solid catalyst. In a more specific aspect, the invention relates to a method and apparatus for removing exothermic heat of regeneration and minimizing radiant heat absorption by catalyst undergoing regeneration while located in a radiant heating zone.

A recent development in the catalytic conversion art is the employment of catalyst tubes for catalytic conversions where the heat is supplied to the catalyst tubes in a furnace by radiation rather than by the older method of transferring most of the heat to the catalyst tubes by conduction. Such furnaces have proved very advantageous, permitting closer control of conversion conditions throughout the length and circumference of the columnar mass of catalyst. However, certain problems in the employment of such a system have arisen. As is well known, after a make period utilizing a catalyst for conversion of the reactant such as a hydrocarbon, there is required a period of regeneration, usually with a gas containing oxygen which oxidizes carbonaceous deposits. In this connection, one of the main problems in such a furnace is that the walls and burners of the furnace have a high heat capacity and, even if the burners are turned off during the regeneration period, an excessive amount of heat is radiated to the catalyst. Since heat is also supplied during regeneration by the exothermic regeneration combustion reaction, it has been found necessary to sharply limit the rate of regeneration since otherwise the catalyst becomes overheated, deteriorating the activity of the catalyst.

An object of the invention is to provide a method for operation of the regeneration cycle which permits increased rates of regeneration without overheating the catalyst. Another object of the invention is to provide apparatus allowing removal of heat during regeneration in such a radiant, catalytic conversion reactor or furnace.

Other objects, as well as aspects and advantages, of the invention will become apparent from a study of the accompanying disclosure and the drawings.

I have now found that, by allowing atmospheric air to enter the lower portion of the radiant heating zone containing confined columnar masses of catalyst undergoing regeneration with an oxidizing gas, a high enough flow of air will pass from the lower portion of the radiant heating zone and out the upper portion thereof merely under the influence of natural convection to allow greatly increased rates of regeneration without thermal deterioration of the catalyst.

I also provide, according to my invention, apparatus for automatically and periodically allowing atmospheric air to enter the lower portion of the furnace during the periods of regeneration and automatically preventing such flow during periods of utilization of the catalyst for conversion.

The invention will be better understood from a description of the drawings which are a schematic representation of an embodiment of the invention, and of which:

Figure 1 is a side elevation of a catalytic furnace embodying the principals of the invention.

Figure 2 is a cross-sectional view of Figure 1 taken along line 2—2.

Figure 4:
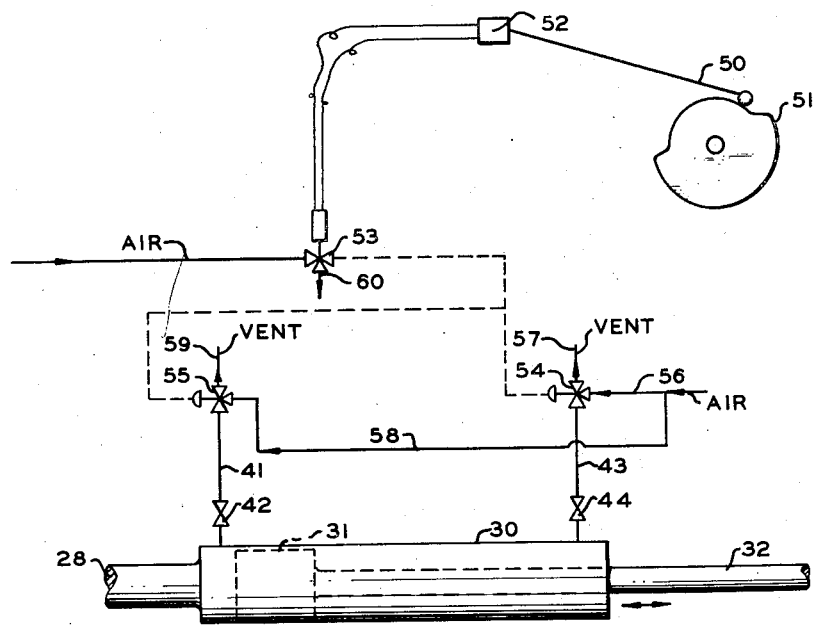
Figure 4 is a representation of the automatic control system for operation of the pneumatic ram shown in Figure 3.

Referring now to the furnace shown in Figures 1 and 2, conduits 1 are disposed vertically in two staggered rows near the center line of the furnace within shell 2. Shell 2 is constructed in a usual manner employing refractory members capable of withstanding high temperatures, and has the usual outer covering of sheet metal. Plural radiant burners 3 are located in two opposite walls of shell 2, as illustrated, and each contains combustion mixture distributing means 5 and refractory cups 6. The radiant burners 3 are arranged in horizontal rows of burners which are equally vertically spaced, and burners in each row are equally spaced from adjacent burners in the row. Other arrangements are possible, but the illustrated arrangement is especially advantageous from the standpoint of maximum control of the heat supply to each tube at different levels. Details of burner construction form no part of the present invention. It is sufficient to note that a combustible mixture is supplied to each cup 6 through distributors 5 and is burned to heat the cup to a high temperature such that a large portion of the heat is radiated to conduits 1 and the heat is subsequently transferred to the catalyst contained in the tubes. Refractory shall 2 also becomes highly heated and contributes to the radiation.

Headers 7 are provided for supply of fluid to be converted in the furnace to each of the rows of conduits 1 in parallel flow, and headers 8 are provided for common withdrawal of the converted fluid. Although two rows of staggered tubes are shown, other arrangements are applicable, such as a single row of tubes down the center line of the furnace. In the furnace shown, it is advantageous that each burner 3 be individually adjustable and that each horizontal row of burners be arranged to be adjusted in the operation of the furnace so that the temperature of each radiant refractory burner cup in a particular horizontal row is the same as the others. It is also advantageous that a plurality of symmetrically located flues 9 be provided, as shown; in the drawings, four flues are provided. Such an arrangement provides for an even and symmetrical distribution of combustion products through the furnace, so that each conduit 1 receives approximately the same amount of heating by conduction and convection from the gases. The major portion of heat transferred, however, in the operation of this furnace is by radiation.

The conduits 1 are at least partially filled with a bed of solid contact catalyst, and have a support means located in each tube for holding the catalyst in place. The bed of catalyst is indicated by the numeral 10, and the support by 11 in Figure 2.

As illustrated in Figures 1 and 2, tubes 1 have flanged connections near the top and bottom to facilitate the removal of a single tube without necessitating shutting down of the furnace for extended periods. It should be noted that Figure 1 is a cross-sectional view taken along the line 1—1 of Figure 2; thus, only one row of the catalyst tubes is shown in Figure 1. The other row of tubes is staggered intermediate the tubes in the row shown.

Figure 3:
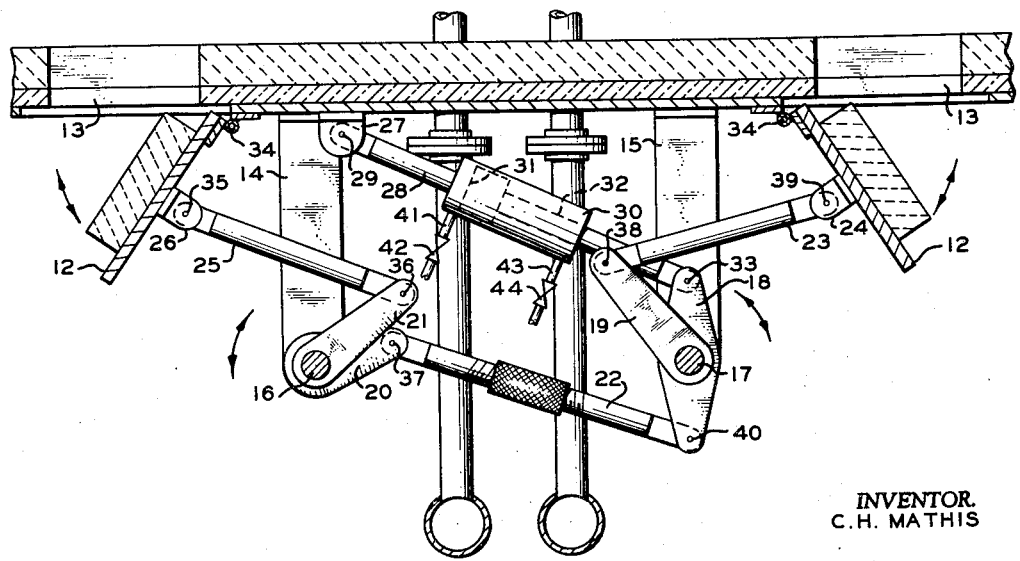
Figure 3 is an enlargement of the door operating mechanism shown at the bottom of the furnace in Figures 1 and 2.

In Figures 1 and 2, there are shown hinged doors 12 in open position. In this case, there are six doors in the furnace, three on each side. More or less doors can be employed, but the openings are preferably equivalent to at least 15 percent of the cross-sectional area of the furnace. These doors are all mechanically connected to an automatic pneumatic operating system which automatically opens all the doors at the same time and automatically closes them at the same time. Figures 3 and 4 show the system in more detail. The doors 12 in their closed position cover the openings 13 in the bottom of the furnace. As shown in the drawing the doors 12 preferably contain on their top surface a refractory mass which substantially fills the openings 13 when the doors are closed. Supports 14 and 15 are rigidly mounted and carry, respectively, shafts 16 and 17, which shafts can rotate about their axis. Members 18 and 19 associated with the three doors on one side of the furnace are rigidly keyed to member 17. Members 20 and 21 associated with each of the three doors along the other side of the furnace are rigidly keyed to member 16. Member 22 connects members 18 and 20. Member 23 connects members 19 and 24, member 24 being rigidly attached to door 12. Member 25 connects members 21 and 26, member 26 being rigidly attached to door 12 on the other side of the furnace. Member 27 is also a rigid stationary member. Member 28 is connected at one end to 27 at free pivot point 29 and at the other end is rigidly connected to pneumatic cylinder 30 which contains piston 31 rigidly connected to member 32. Member 32 is pivotally connected at point 33 to member 18. The doors 12 are each pivoted at points 34, as shown. Points 35, 36, 37, 38, 39 and 40 are also each free pivot points. In operation, it will be seen that, as air is introduced into cylinder 30 through line 41 and valve 42, all of the doors will close and that, as air is introduced into cylinder 30 through line 43 and valve 44, all of the doors will simultaneously open.

Figure 4 shows the control system which controls the operation of the pneumatic ram shown in Figure 3. Arm 50 rides on a cam 51 of the cycle timer which controls the operation of the make cycles and regeneration cycles of the furnace. The depressed portion of the cam represents the period during which the micro switch 52, which is operatively connected to three-way solenoid valve 53, is energized to operate the solenoid valve to admit 20-pound instrument air to three-way motor valves 54 and 55. During this portion of the cycle, instrument air is admitted to each of these motor valve diaphragms. Three-way valve 54 is normally closed to the admission of 60-pound air through line 56 and is normally open to the flow of air from cylinder 30 through valve 44, lines 43 and valve 54 out through vent 57. Three-way valve 55 is normally open to the admission of 60-pound air through lines 56 and 58 and closed as to any flow through the valve from line 41 out through vent 59. At the beginning of the regeneration cycle, instrument air is admitted to the diaphragm of three-way valve 54, closing vent 57 and admitting 60-pound air through line 56, valve 54, line 43, valve 44, into cylinder 30, forcing piston 31 to the left and causing the doors 12 to open. At the same time, the 20-pound instrument air admitted to the diaphragm of valve 55 causes the closing of the valve 55 to the admission of air through line 58 and opens the valve for flow through lines 41 valve 55 and out through vent 59, thus allowing the air in cylinder 30 on the left side of piston 31 to be vented from the cylinder. As the cam rotates, the member 50 reaches the raised portion of the cam, cutting off micro switch 52 and allowing the solenoid valve to cut off the flow of instrument air while opening vent 60 through which air from the diaphragms is vented to the atmosphere.

In the specific Example I which follows, there is shown one embodiment of a complete cycle of operations, which operations are controlled by the cycle timer before mentioned. In this example, a feed comprising principally normal butane was dehydrogenated employing a furnace and control system as shown in Figures 1 to 4, except that each row of catalyst tubes contained sixteen catalyst-filled tubes. At the end of the make or dehydrogenation cycle, the burners can be completely turned off, but it is usually preferred that they be kept burning with a low flame, that is, a much reduced amount of fuel so that the burners will not have to be reignited at the beginning of the next make cycle after the regeneration cycle. It will be seen that in the specific example given the burners were not completely turned off.

EXAMPLE I

In this example, each of the 32 catalyst tubes has a nominal inside diameter of 2.5 inches, and is filled with catalyst to a bed depth of 9.5 feet, giving a total catalyst volume of about 10.4 cubic feet. The catalyst was a chromium oxide-alumina catalyst, 20 percent $Cr_2O_3$ deposited on 80 percent alumina base and contained about 0.35 weight percent of the total catalyst of sodium oxide. Table I shows the feed composition and the effluent composition in the dehydrogenation cycle and also shows the regeneration gas composition going into the furnace in the regeneration cycle. A complete cycle of operation including make cycle and regeneration cycle consumed 120 minutes. This cycle was, of course, repeated many times. The valves which are referred to in Table II are valves on lines leading to and from, respectively, the inlet and the outlet headers supplying the catalyst tubes shown in Figures 1 and 2. In Table III are shown the operating data for the catalytic furnace. The catalyst regeneration peak temperature shown for the regeneration period is the average temperature for a number of cycles. This temperature did not vary more than 10 or 15° F. from cycle to cycle.

Table 1.—Composition of feed and effluent streams [1]

| Component | Hydrocarbon Cycle | | Regeneration Cycle |
|---|---|---|---|
| | Feed | Effluent | Inlet |
| Carbon Monoxide | | 0.2 | |
| Carbon Dioxide | | | 12.5 |
| Hydrogen | | 23.9 | |
| Methane | 1.2 | 2.6 | |
| Ethylene | 0.1 | 0.9 | |
| Ethane | 0.3 | 1.7 | |
| Propylene | 0.1 | 1.3 | |
| Propane | | 0.5 | |
| Butadiene | | 1.9 | |
| Isobutylene | | 0.3 | |
| n-Butylenes | 2.1 | 17.4 | |
| Isobutane | 0.6 | | |
| n-Butane | 95.1 | 49.3 | |
| Neopentane | 0.5 | | |
| Nitrogen | | | 82.3 |
| Oxygen | | | 2.2 |
| Water | | | 3.0 |
| Total | 100.0 | 100.0 | 100.0 |

[1] Volume percent.

Table II.—Sequence of operations

| Operation Description | Total Elapsed Time |
|---|---|
| 1. Inlet Hydrocarbon Time Cycle Valve Opens | 20 seconds. |
| 2. Outlet Hydrocarbon Time Cycle Valve Opens | |
| 3. Butane Dehydrogenation On-Stream Period | 60 minutes. |
| 4. Outlet Hydrocarbon Time cycle Valve Closes; air inlet doors 12 open; fuel to burners turned nearly off | |
| 5. Inlet Hydrocarbon Time Cycle Valve Closes | 40 seconds. |
| 6. Inlet Regeneration Time Cycle Valve Opens | |
| 7. Outlet Regeneration Time Cycle Valve Opens | |
| 8. Catalyst Regeneration On-Stream Period. After 45 minutes of regeneration, the air inlet doors 12 close and fuel to radiant burners is gradually increased to bring catalyst to conversion cycle temperature. | 55 minutes. |
| 9. Outlet Regeneration Time Cycle Valve Closes | |
| 10. Inlet Regeneration Time Cycle Valve Closes | |
| 11. Regeneration Gas Bleeder (To Atmosphere) Valve Opens. | 4 minutes. |
| 12. Regeneration Gas Bleeder (To atmosphere) Valve Closes. | |
| | 120 minutes. |

Table III—Operating conditions

Catalyst volume: 10.86 cu. ft. Bed depth: 9.5 ft.
Tube diameter 2.5″ I.D.

DEHYDROGENATION PERIOD DATA

| | |
|---|---|
| Average catalyst temperature (bottom of bed) °F | 1068 |
| Average tube wall temperature (middle of tube) °F | 1165 |
| Hydrocarbon inlet temperature (avg. during hour) °F | 927 |
| Firebox temperature °F | 1265 |
| Stack temperature °F | 1150 |
| Hydrocarbon flow rate s.c.f.h. (Space velocity[1]: 828) | 8576 |
| Fuel flow rate s.c.f.h. | 2448 |
| Hydrocarbon inlet header pressure p.s.i.g. | 31 |
| Hydrocarbon outlet header pressure p.s.i.g. | 4 |
| Burner fuel header pressure (avg.) p.s.i.g. | 23 |

[1] Space velocity: Gas flow rate per catalyst volume, s.c.f.h./c.f.

REGENERATION PERIOD DATA

| | |
|---|---|
| Regeneration gas flow rate s.c.f.h. (Space velocity[1]: 2550) | 26,000 |
| Regeneration gas inlet header pressure p.s.i.g. | 122 |
| Regeneration gas outlet header pressure p.s.i.g. | 100 |
| Catalyst regeneration peak temperature (avg.) °F | 1360 |
| Time for regeneration flame front to pass through bed minutes | 29 |

[1] Space velocity: Gas flow rate per catalyst volume, s.c.f.h./c.f.

It will be seen that the conversion in this example was about 37 percent.

In comparison with the results of Example I, when operating with the air doors 12 closed during regeneration, but under the same conditions with the same feed, the conversion must be reduced during the make cycle by lowering the dehydrogenation temperature so as to lower the conversion to about 17 percent. This is necessary in order to limit the coke laydown on the catalyst so that the latter does not become heated to over 1400° F. during regeneration, when employing the same regeneration gas as in Example I and a regeneration time as in that example.

The dehydrogenation of butane is merely illustrative of catalytic conversion reactions to which the invention is applicable. Any other conversion reaction wherein the catalyst must be regenerated periodically is applicable for example, fired bed catalytic cracking of gas oil over bauxite to form gasoline, desulfurization of gas oil, kerosine, etc., using a solid contact catalyst such as bauxite, and reforming of straight run gasoline over a fixed bed of solid contact catalyst.

As will be evident to those skilled in the art, various modifications of this invention can be made or followed in the light of the foregoing disclosure and discussion without departing from the spirit or scope of the disclosure or from the scope of the claim.

I claim:

In the operation of a catalytic conversion process wherein a carbonaceous feed material is passed through columnar masses of solid catalyst which receive heat from radiant heat sources surrounding said columnar masses of catalyst, and a catalytic conversion of at least a portion of said feed material is effected with attendant deposition of carbonaceous material on said catalyst, and wherein periodically the flow of feed material is interrupted for a period and during said period carbonaceous material is burned from said catalyst in an exothermic reaction by flowing an oxidizing gas downwardly through said catalyst, the steps of passing atmospheric air directly from the atmosphere upwardly along said columnar masses in indirect heat exchange relationship therewith and countercurrent to said oxidizing gas during said exothermic reaction, said flow of air being effected solely by natural draft, whereby higher rates of burning are possible without thermal deterioration of said catalyst, and passing the resultant heated air out of contact with said columnar masses of solid catalyst at a point adjacent the upper ends thereof.

References Cited in the file of this patent

UNITED STATES PATENTS

| | | |
|---|---|---|
| 1,876,206 | Cross | Sept. 6, 1932 |
| 2,173,984 | Shapleigh | Sept. 26, 1939 |
| 2,304,138 | Barnes et al. | Dec. 8, 1942 |
| 2,304,203 | Pyzel et al. | Dec. 8, 1942 |
| 2,573,149 | Kassel | Oct. 30, 1951 |
| 2,654,657 | Reed | Oct. 6, 1953 |
| 2,666,692 | Dolezal et al. | Jan. 19, 1954 |
| 2,667,410 | Pierce | Jan. 26, 1954 |

FOREIGN PATENTS

| | | |
|---|---|---|
| 545,697 | Great Britain | June 9, 1942 |